(12) United States Patent
Xu et al.

(10) Patent No.: US 12,150,014 B2
(45) Date of Patent: Nov. 19, 2024

(54) BROADCAST AND MULTICAST SERVICE RECEPTION BY IDLE AND INACTIVE WIRELESS DEVICES

(71) Applicant: Apple Inc., Cupertino, CA (US)

(72) Inventors: Fangli Xu, Beijing (CN); Ralf Rossbach, Munich (DE); Haijing Hu, Beijing (CN); Dawei Zhang, Saratoga, CA (US); Yuqin Chen, Shenzhen (CN); Zhibin Wu, Los Altos, CA (US); Sarma V. Vangala, Campbell, CA (US); Srinivasan Nimmala, San Jose, CA (US); Murtaza A. Shikari, Mountain View, CA (US); Srirang A. Lovlekar, Cupertino, CA (US); Sethuraman Gurumoorthy, San Jose, CA (US); Naveen Kumar R. Palle Venkata, San Diego, CA (US); Sudeep Manithara Vamanan, Nuremberg (DE)

(73) Assignee: Apple Inc., Cupertino, CA (US)

( * ) Notice: Subject to any disclaimer, the term of this patent is extended or adjusted under 35 U.S.C. 154(b) by 294 days.

(21) Appl. No.: 17/437,821

(22) PCT Filed: Oct. 22, 2020

(86) PCT No.: PCT/CN2020/122817
§ 371 (c)(1),
(2) Date: Sep. 9, 2021

(87) PCT Pub. No.: WO2022/082594
PCT Pub. Date: Apr. 28, 2022

(65) Prior Publication Data
US 2022/0303729 A1 Sep. 22, 2022

(51) Int. Cl.
*H04W 4/06* (2009.01)

(52) U.S. Cl.
CPC .................................. *H04W 4/06* (2013.01)

(58) Field of Classification Search
CPC ......................................................... H04W 4/06
See application file for complete search history.

(56) References Cited

U.S. PATENT DOCUMENTS

| 2013/0301509 | A1 | 11/2013 | Purnadi |
| 2014/0286222 | A1 | 9/2014 | Yu |

(Continued)

FOREIGN PATENT DOCUMENTS

| KR | 10-2018-0033437 | 4/2018 |
| WO | 2009116614 A1 | 9/2009 |
| WO | 2013173323 A1 | 11/2013 |

OTHER PUBLICATIONS

International Search Report for PCT Patent Application No. PCT/CN2020/122817; mailed Jul. 9, 2021.

(Continued)

*Primary Examiner* — Justin Y Lee
(74) *Attorney, Agent, or Firm* — Kowert, Hood, Munyon, Rankin & Goetzel, P.C.

(57) ABSTRACT

This disclosure relates to techniques for providing broadcast and multicast services to wireless devices while in Idle and Inactive modes a wireless communication system. A wireless device may establish a wireless link with a cellular base station of a cellular network. The wireless device may receive information indicating whether provision of a broadcast or multicast service in one or more of an inactive mode or an idle mode is supported by the cellular network. The wireless device may receive the broadcast or multicast service in one or more of the inactive mode or the idle mode based at least in part on the information indicating whether (Continued)

provision of the broadcast or multicast service in one or more of the inactive mode or the idle mode is supported by the cellular network.

18 Claims, 15 Drawing Sheets

(56) References Cited

U.S. PATENT DOCUMENTS

| | | |
|---|---|---|
| 2018/0279204 A1 | 9/2018 | Kim |
| 2023/0300938 A1* | 9/2023 | Latheef .................. H04W 4/06 370/329 |
| 2023/0389049 A1* | 11/2023 | Kim ...................... H04W 72/23 |

OTHER PUBLICATIONS

Samsung "MBMS Service Request Procedure"; 3GPP TSG-SA2 Meeting #35 Tdoc S2-033376; Bangkok, Thailand; Oct. 22, 2003.
Extended European Search Report for EP Patent Application No. 20958176.8; Jun. 10, 2024.
Spreadtrum Communications "MBS for Idle and Inactive mode UE"; 3GPP TSG-RAN WG2 Meeting #111 R2-2007055; Aug. 17, 2020.
Office Action for KR Patent Application No. 10-2023-7013474; Aug. 24, 2024.

* cited by examiner

BROADCAST AND MULTICAST SERVICE RECEPTION BY IDLE AND INACTIVE WIRELESS DEVICES

PRIORITY CLAIM INFORMATION

This application is a national stage application of International Application No. PCT/CN2020/122817, filed on Oct. 22, 2020, titled "Broadcast and Multicast Service Reception by Idle and Inactive Wireless Devices", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for providing broadcast and multicast services to idle and inactive wireless devices in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™ etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

Embodiments are presented herein of apparatuses, systems, and methods for providing broadcast and multicast services to idle and inactive wireless devices in a wireless communication system.

According to the techniques described herein, a cellular network may provide information to a wireless device indicating whether support for a broadcast or multicast service is provided by the cellular network in idle mode and/or inactive mode. Control over whether such support is provided may reside with either or both of the core network or the radio access network portion of the cellular network. The information indicating whether idle/inactive support for the broadcast or multicast service is provided may accordingly include information provided by either or both of the core network or the radio access network. For a broadcast or multicast service whose provision is supported in idle/inactive, configuration information for receiving the broadcast or multicast service in idle/inactive may be provided to the wireless device by the network, and the wireless device may be able to receive the broadcast or multicast service from the network while idle or inactive.

Additionally, techniques are described herein for supporting wireless device mobility in conjunction with potential multicast and/or broadcast service reception while idle or inactive. For example, the cellular network may provide a list or other indication of cells or frequencies of the cellular network that support broadcast or multicast service in idle mode and/or inactive mode. The wireless device may be able to use such information, and/or other information, to perform cell re-selection to a cell that supports a broadcast or multicast service that the wireless device is interested in receiving, at least according to some embodiments.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
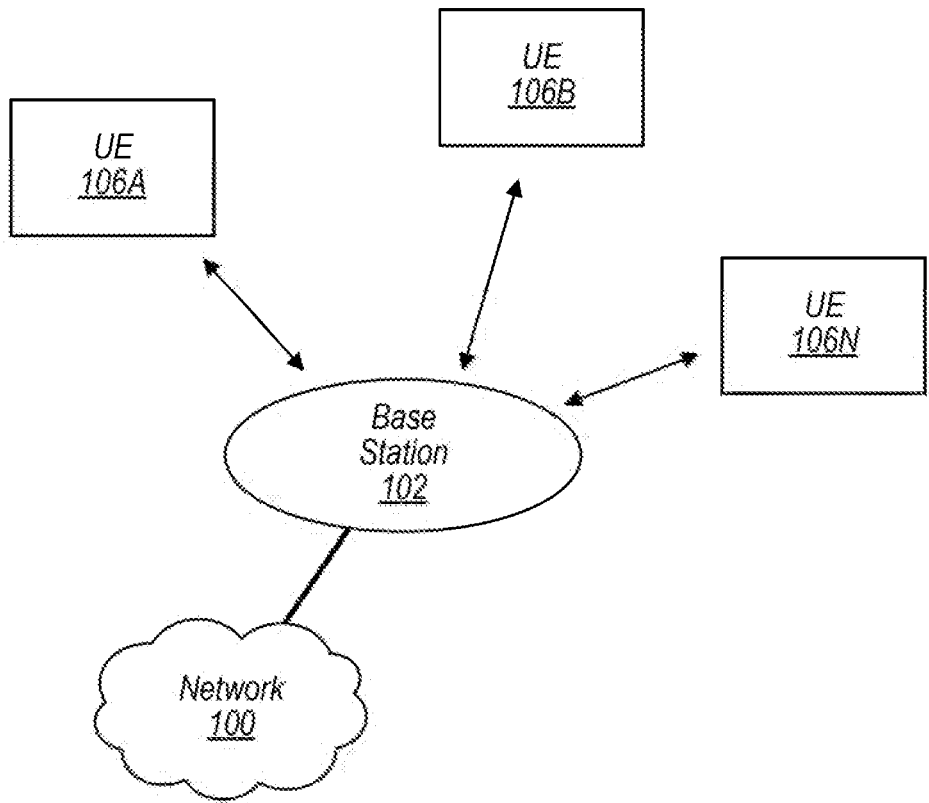
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
RAN: Radio Access Network
CN: Core Network
TX: Transmission/Transmit
RX: Reception/Receive
RAT: Radio Access Technology
TRP: Transmission-Reception-Point
RRC: Radio Resource Control
MBMS: Multimedia Broadcast Multicast Service
TMGI: Temporary Mobile Group Identity
NAS: Non Access Stratum
AS: Access Stratum Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to," Reciting a component that is configured to perform one or more tasks is expressly intended not to invoke 35 U.S.C. § 112, paragraph six, interpretation for that component.

Figure 2:
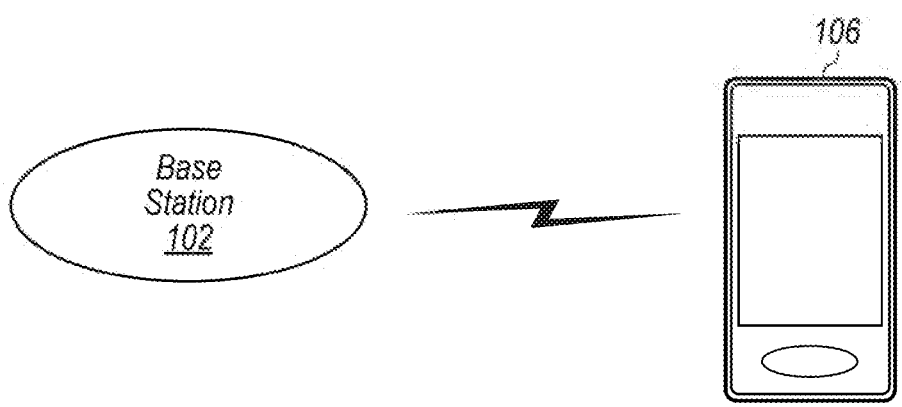
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 100 might be configured to communicate using either or both of a 3GPP cellular communication standard or a 3GPP2 cellular communication standard. In some embodiments, the UE 106 may be configured to receive broadcast and multicast services while idle or inactive, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 100 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
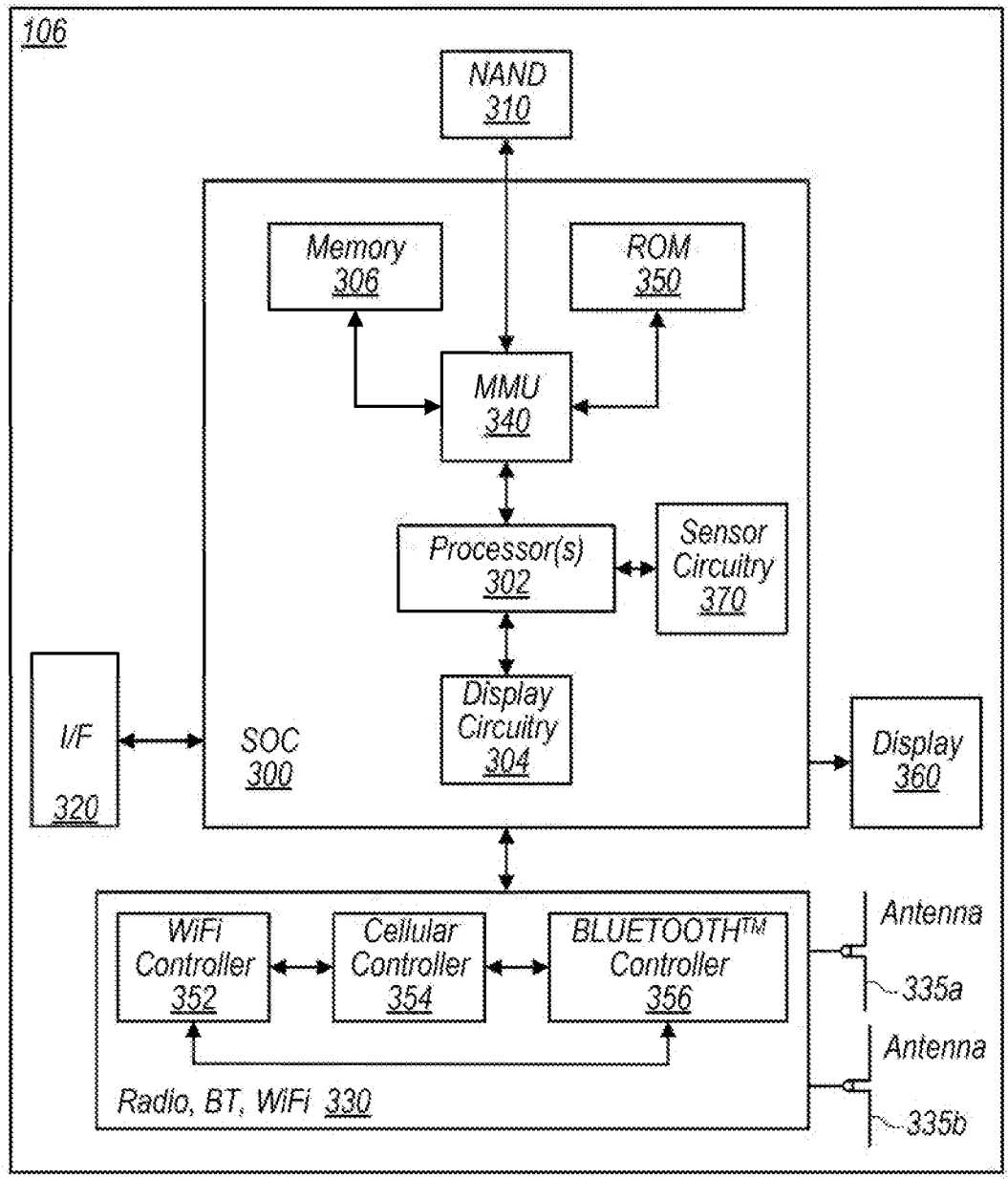
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for receiving broadcast and multicast services while in Idle and Inactive modes, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform broadcast and multicast service reception while in Idle and Inactive modes according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example. Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
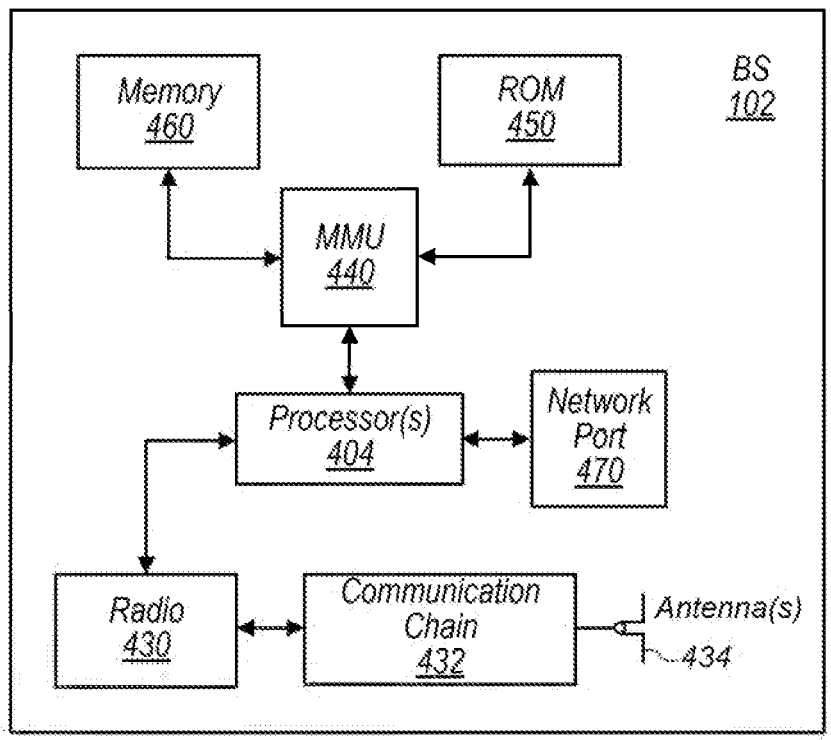
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein. e.g., by executing program instructions stored on a memory medium (e.g., a non-transitory computer-jo readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Figure 5:
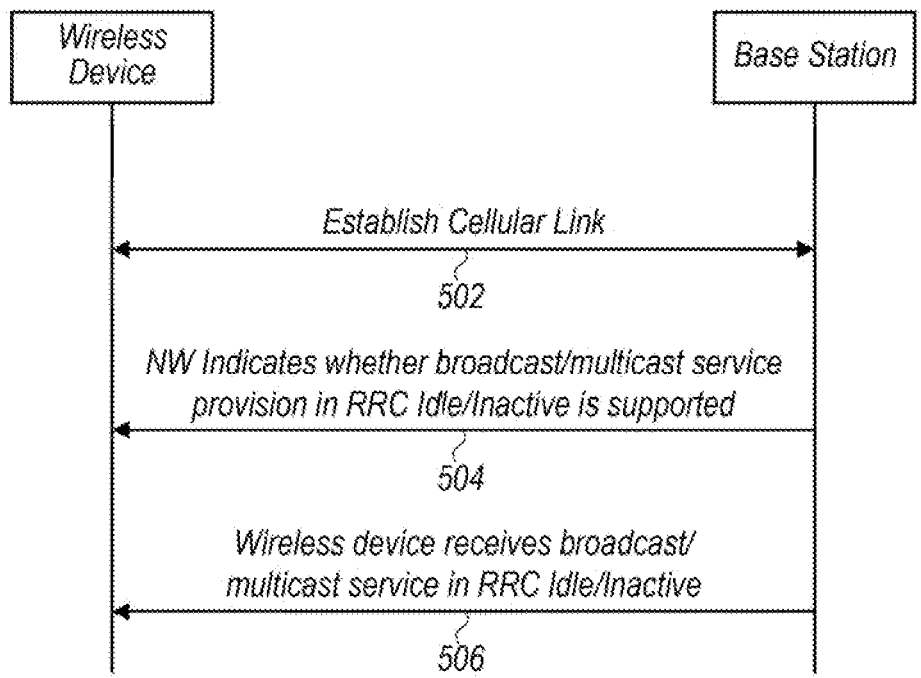
FIG. 5 is a flowchart diagram illustrating aspects of an exemplary possible method for providing broadcast and multicast services to wireless devices while in Idle and Inactive modes in a wireless communication system, according to some embodiments.

FIG. 5—Broadcast and Multicast Service Provision in Idle and Inactive Modes

Wireless communication is being used for an increasingly broad set of use cases. Provision of broadcast and multicast services, such as for multimedia content and/or any of various other possible purposes, may represent one such use case of increasing interest. As one example, 3GPP supports and is further developing techniques relating to provision of multimedia broadcast multicast services (MBMS).

It may be beneficial, at least in some instances, to support techniques for providing such services in a relatively power efficient manner, e.g., to reduce the battery consumption by wireless devices receiving the services. One existing mechanism in cellular communication for reducing power consumption may include operating in an idle or inactive mode (such as a 3GPP RRC Inactive state or a 3GPP RRC Idle state), e.g., as opposed to a connected mode (such as a 3GPP RRC connected state).

Accordingly, it may be useful to provide techniques for expanding support for provision of broadcast and multicast services in idle and inactive modes, for example to increase the scope of services that can be provided via cellular communication with potentially lower power consumption. FIG. 5 is a flowchart diagram illustrating such a method for providing broadcast and multicast services to wireless devices while in idle and inactive modes in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features. e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

In some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TC states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 504, the network may indicate whether provision of a broadcast or multicast service in one or more of RRC idle mode or RRC inactive mode is supported. The indication may be received by a wireless device, e.g., based at least in part on an indication provided by the wireless device that the wireless device is interested in receiving the broadcast or multicast service. For example, the wireless device may provide a request to join a 3GPP MBMS session for the broadcast or multicast service to the cellular network, and may receive the indication of whether provision of the broadcast or multicast service in one or more of RRC idle mode or RRC inactive mode is supported. Note that the indication of whether provision of the broadcast or multicast service in one or more of RRC idle mode or RRC inactive mode may be received directly in response to such a request by the wireless device (e.g., in a NAS message accepting the request to join the 3GPP MBMS session), or at any of various other times (e.g., in broadcast or on-demand system information, via dedicated RRC signaling, etc.)

The network support (or lack thereof), and correspondingly the indication of network support (or lack thereof), may be determined and indicated for one or more groups of broadcast and/or multicast services collectively, or may be determined and indicated on a per service basis. Similarly, the network support (or lack thereof), and correspondingly the indication of network support (or lack thereof), may be determined and indicated for idle and inactive mode reception collectively, or may be separately determined and indicated per mode.

The indication may include information received by the wireless device from one or multiple cellular network entities. For example, network control over whether broadcast and/or multicast service provision is provided in either or both of idle or inactive modes may reside with either or both of the cellular core network (CN) or radio access network (RAN), according to various embodiments.

Thus, as one possibility, the indication may include information received by the wireless device from a CN element (such as an AMF) of the cellular network via non access stratum signaling, which may indicate whether provision of the broadcast or multicast service in one or more of RRC inactive mode or RRC idle mode is supported by the cellular network (or at least by the CN). For example, as previously noted, in some instances the indication may be provided in a NAS message in response to a request to join a MBMS session. Note that according to a configuration in which the CN alone provides the indication of whether broadcast and/or multicast service provision is supported, the CN may request information from a cellular base station serving the wireless device indicating whether the cellular base station supports provision of the broadcast or multicast service in one or more of RRC inactive mode or RRC idle mode, and may receive information indicating whether the cellular base station supports provision of the broadcast or multicast service in one or more of RRC inactive mode or RRC idle mode in response to the request. In such a scenario, the CN element may use this information when determining whether provision of the broadcast or multicast service in one or more of RRC inactive mode or RRC idle mode is supported by the network.

As another possibility, according to a configuration in which both the CN and the RAN provide indications of whether broadcast and/or multicast service provision is supported, the CN may not request such information from the RAN, and may instead provide an indication to the wireless device of whether the CN supports provision of the broadcast or multicast service in one or more of RRC inactive mode or RRC idle mode, which may not be reflective of whether the RAN supports provision of the broadcast or multicast service in one or more of RRC inactive mode or RRC idle mode. In such a scenario, the indication also may include information received by the wireless device from a RAN element (such as a cellular base station) of the cellular network via access stratum signaling, which may indicate whether provision of the broadcast or multicast service in one or more of RRC inactive mode or RRC idle mode is supported by the RAN. In this scenario, the indication provided by the RAN may not be reflective of whether the CN supports provision of the broadcast or multicast service in one or more of RRC inactive mode or RRC idle mode. Thus, in such a scenario, it may be the case that the wireless device determines that provision of the broadcast or multicast service is supported by the current serving cell if both the information received from the RAN and the information received from the CN indicate that the broadcast or multicast service is supported in idle and/or inactive mode.

As a still further possibility, a configuration may be used in which the RAN alone provides the indication of whether broadcast and/or multicast service provision is supported in idle and/or inactive mode, in such a scenario, the indication may include information received by the wireless device from a RAN element (such as a cellular base station) of the cellular network via access stratum signaling, which may indicate whether provision of the broadcast or multicast service in one or more of RRC inactive mode or RRC idle mode is supported by the cellular network (e.g., including both the RAN and the CN). In scenarios in which the RAN provides access stratum signaling indicating whether provision of the broadcast or multicast service in one or more of RRC inactive mode or RRC idle mode is supported, the indication may be provided in broadcast system information or in dedicated RRC signaling, such as in on-demand system information, in RRC reconfiguration information, in a RRC release message triggering a transition from RRC connected to RRC inactive or RRC idle, and/or any of various other possible types of signaling.

In some instances, the network (e.g., a CN element and/or a RAN element) may provide information to the wireless device indicating one or more cells or frequencies that support provision of the broadcast or multicast service. For example, a cell/frequency list could be provided that indicates a set of cells that support provision of the broadcast or multicast service in at least one RRC state, and/or may more explicitly include information indicating in which RRC states each cell/frequency in the list supports provision of the broadcast or multicast service. Such information may be useful, for example, to help support wireless device mobility in such a manner as to allow the wireless device to achieve service continuity for the broadcast or multicast service, for example including when performing wireless device driven cell re-selection while idle or inactive.

In some instances, the network may additionally or alternatively provide cell prioritization information for performing cell re-selection based at least in part on cell support for broadcast or multicast service. For example, the network may specify whether such cell re-selection based at least in part on cell support for broadcast or multicast service is allowed by the network, and/or may specify a framework according to which such cell re-selection based at least in part on cell support for broadcast or multicast service is permitted to be performed.

If such a framework is specified, the framework could include prioritizing cells that support the broadcast or multicast service in idle, inactive, and connected modes first (e.g., provided the cells meet signal strength/quality requirements for performing cell re-selection), then prioritizing cells that support the broadcast or multicast service in connected mode (e.g., again provided the cells meet signal strength/quality requirements for performing cell re-selection) if there are no cells that support the broadcast or multicast service in idle, inactive, and connected modes and also meet signal strength/quality requirements for performing cell re-selection, then prioritizing any cells that meet signal strength/quality requirements for performing cell re-selection if there are no cells that support the broadcast or multicast service and also meet signal strength/quality requirements for performing cell re-selection.

As another possibility, the framework could include prioritizing cells that support the broadcast or multicast service in any (e.g., in at least one) RRC state first (e.g., provided the cells meet signal strength/quality requirements for performing cell re-selection), then prioritizing any cells that meet signal strength/quality requirements for performing cell re-selection if there are no cells that support the broadcast or multicast service and also meet signal strength/quality requirements for performing cell re-selection. Note that other prioritization frameworks are also possible.

The network may also provide layer 1 (L1, e.g., PHY) and layer 2 (L2, e.g., MAC/RLC/PDCP/SDAP) configuration information for broadcast and/or multicast service reception in RRC inactive mode and/or RRC idle mode to the wireless device. Such information may be provided via on-demand system information, in a RRC connection release message, or in a RRC reconfiguration message, among various possibilities.

In 506, the wireless device may receive the broadcast or multicast service while in RRC idle mode or RRC inactive mode. For example, if the information indicating whether provision of the broadcast or multicast service in one or more of RRC inactive mode or RRC idle mode is supported by the cellular network indicates that the current serving cell of the wireless device does support provision of the broadcast or multicast service in RRC inactive mode and RRC idle mode, the wireless device may receive the broadcast or multicast service via the current serving cell while in RRC inactive mode or RRC idle mode.

As another possibility, if the network indicates that the current serving cell of the wireless device does not support provision of the broadcast or multicast service in RRC inactive mode or RRC idle mode, the wireless device may attempt to establish a RRC connection with the current serving cell while in RRC inactive mode or RRC idle mode, e.g., based at least in part on the indication that the current serving cell of the wireless device does not support provision of the broadcast or multicast service in RRC inactive mode or RRC idle mode. The wireless device may provide an indication that the purpose for establishing the RRC connection is to receive the broadcast or multicast service. In such a scenario, the wireless device may receive the broadcast or multicast service via the serving cell while in RRC connected mode. Alternatively, the network may perform handover of the wireless device to another serving cell, which may be able to provide the broadcast or multicast service. In such a scenario, the wireless device may receive the broadcast or multicast service via the new serving cell while in RRC connected mode, and/or potentially while in RRC inactive mode and/or RRC idle mode, e.g., if supported by the new serving cell.

As still another possibility, if the network indicates that the current serving cell of the wireless device does not support provision of the broadcast or multicast service in RRC connected mode, RRC inactive mode, or RRC idle mode, the wireless device may perform cell re-selection while in RRC inactive mode or RRC idle mode. The cell re-selection may be performed based at least in part on the indication that the current serving cell of the wireless device does not support provision of the broadcast or multicast service in RRC connected mode, RRC inactive mode, or RRC idle mode. At least in some instances, the cell re-selection may prioritize selection of a cell that supports provision of the broadcast or multicast service, for example according to a prioritization framework specified by the network (e.g., as previously described herein), and/or using a list of cells/frequencies that support provision of the broadcast or multicast service (e.g., as also previously described herein), among various possibilities. After such cell re-selection, the wireless device may receive the broadcast or multicast service via the new serving cell while in RRC inactive mode and/or RRC idle mode, e.g., if supported by the new serving cell.

Thus, the method of FIG. 5 may be used to provide broadcast and multicast services to wireless devices while in Idle and Inactive modes in a cellular communication system. Such techniques may be useful for expanding the range of possible services that can be provided in inactive and idle modes, which may in turn reduce wireless device power consumption, among other possible benefits, at least according to some embodiments.

FIGS. 6-19 and Additional Information

FIGS. 6-19 illustrate further aspects that might be used in conjunction with the method of FIG. 5 if desired. It should be noted, however, that the exemplary details illustrated in and described with respect to FIGS. 6-19 are not intended to be limiting to the disclosure as a whole: numerous variations and alternatives to the details provided herein below are possible and should be considered within the scope of the disclosure.

Currently, for 3GPP NR multimedia broadcast multicast service (MBMS), a UE may perform a MBMS session join procedure via non access stratum (NAS) signaling to receive the MBMS data for a multicast service, and similarly perform a MBMS session leave procedure via NAS signaling to leave the MBMS session. It may be the case that for the NAS session join/leave procedures, a UE is currently required to enter RRC connected state. For example, in some instances, a wireless device may be able to perform MBMS session join, start, and leave procedures in accordance with the procedures described and illustrated in sections 6.2.2.1, 6.2.2.2, and 6.2.2.5 of 3GPP TR 23.757 v.1.0.0.

In addition to supporting provision of broadcast and multicast services to wireless devices while a RRC connection is established, it may also be beneficial to support provision of such services to wireless devices that are operating in RRC idle and inactive modes/states, at least according to some embodiments. Accordingly, it may be useful to introduce various possible techniques that can provide support for UEs to receive MBMS data in RRC idle and/or inactive states. Such techniques may include techniques for supporting the ability of a cellular network to control enabling and disabling of MBMS reception in idle/inactive states, techniques for supporting idle/inactive mobility in conjunction with MBMS reception, and/or techniques for configuring provision for MBMS reception in idle/inactive states, among various possibilities.

A wireless device may be able to acquire information (e.g., temporary mobile group identity (TMGI), high layer multicast (HL MC) address) for MBMS services associated with an MBMS session when performing the session join procedure. According to some embodiments, it may be the case that a UE is only allowed to perform MBMS reception in idle/inactive in accordance with network configuration. There may be several options for such network configuration. For example, as one such possibility, the core network (CN) may control whether MBMS service is provided in idle/inactive/connected. As another possibility, the radio access network (RAN) may control whether MBMS service is provided in idle/inactive/connected. As a further possibility, both the CN and the RAN may control whether MBMS service is provided in idle/inactive/connected. According to the various possible options for such network configuration, NAS and/or AS (e.g., RRC) signaling may be used to indicate to a UE which MBMS service(s) can be provided in idle/inactive/connected and/or to provide a cell list (e.g., that indicates cells supporting MBMS service(s) in one or more of idle/inactive/connected).

There may be various possible options for how a UE can handle various possible scenarios relating to the availability or unavailability of MBMS services in one or more of idle/inactive/connected when the UE is interested in receiving one or more MBMS services. As one such option, in a scenario in which a UE cannot (is not allowed to) receive a MBMS service in which the UE is interested in receiving in idle/inactive (e.g., per network configuration of the current cell camped on by the UE), but can receive the MBMS service in RRC connected, the UE may trigger access to the RRC connected state, may indicate that a purpose of the RRC connection is to receive the MBMS service when performing the access procedure, and may receive the MBMS service while in the RRC connected state. As another option, in a scenario in which a UE cannot (is not allowed to) receive a MBMS service in which the UE is interested in receiving in idle/inactive (e.g., per network configuration of the current cell camped on by the UE), the UE may similarly trigger access to the RRC connected state, and may indicate that a purpose of the RRC connection is to receive the MBMS service when performing the access procedure, and the network may decide whether to provide the MBMS service via the current cell in the RRC connected state or to handover the UE to another cell (e.g., which may support MBMS reception in idle/inactive). As still another option, in a scenario in which a UE cannot (is not allowed to) receive a MBMS service in which the UE is interested in receiving in idle/inactive/connected (e.g., per network configuration of the current cell camped on by the UE), the UE may perform cell re-selection to camp on another cell, on which the UE may be able to receive the MBMS service in idle/inactive or connected.

Figure 6:
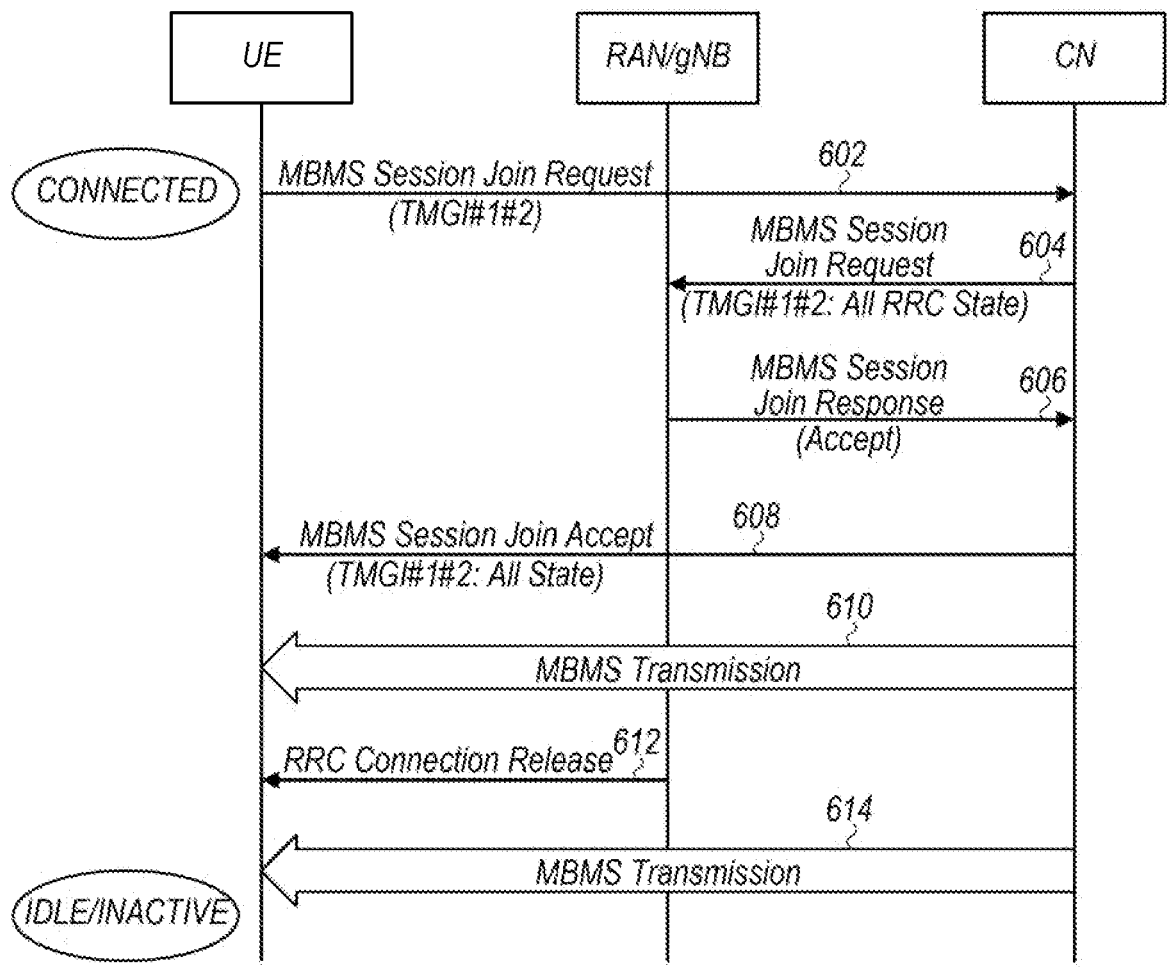
FIGS. 6-11 are signal flow diagrams illustrating aspects of exemplary possible techniques for indicating to a wireless device in which radio resource control states provision of a broadcast or multicast service is supported, according to some embodiments.
Figure 7:
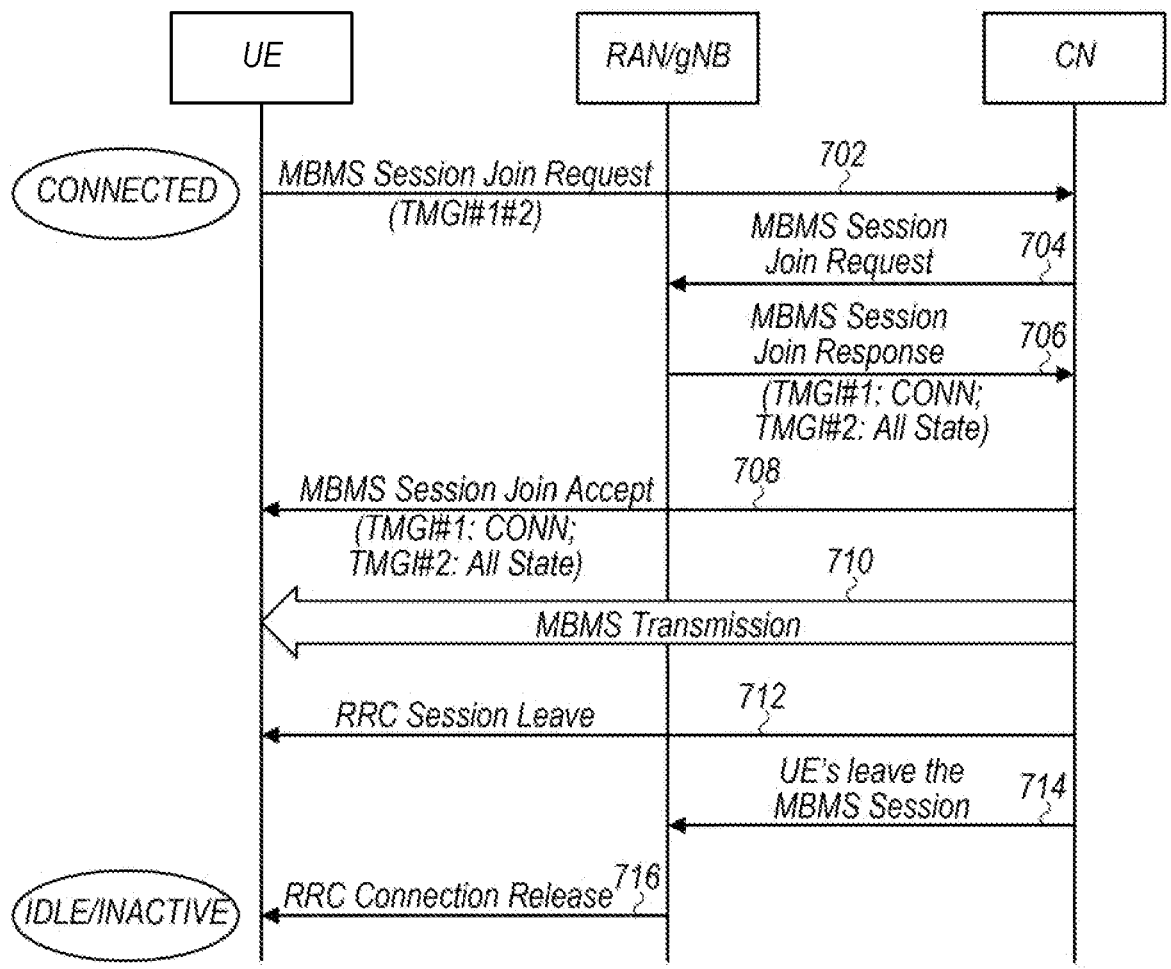

FIGS. 6-7 are signal flow diagrams illustrating aspects of example scenarios in which the CN controls whether MBMS services are provided in idle/active/connected, according to some embodiments. In the scenario of FIG. 6, in 602, a UE may provide a MBMS session join request (indicating a request to join two MBMS sessions, "TMGI #1" and "TMGI #2") to the CN. When the CN decides to provide the MBMS services, the CN may negotiate with the RAN/gNB regarding the potentially supported RRC state(s). Thus, in 604, the CN may provide a MBMS session join request message to the RAN/gNB. In this scenario, the CN may provide an indication of the requested RRC state(s) that the CN is requesting the MBMS sessions be supported in (e.g., all RRC states, in the illustrated example). In 606, the RAN/gNB may provide a MBMS session setup response, indicating that the RAN/gNB accepts the configuration provided by the CN. In 608, the CN may provide (e.g., using NAS signaling) a MBMS session join accept message to the UE, which may indicate the corresponding RRC state(s) for the MBMS service provision, and potentially may include a cell list associated with the MBMS service provision. In 610, the CN may transmit the MBMS services to the UE. In 612, the RAN/gNB may release the RRC connection of the UE, and the UE may operate in idle or inactive mode. In 614, the UE may continue receiving the MBMS transmission while operating in the idle or inactive mode.

In the scenario of FIG. 7, in 702, a UE may provide a MBMS session join request (indicating a request to join two MBMS sessions, "TMGI #1" and "TMGI #2") to the CN. When the CN decides to provide the MBMS services, the CN may negotiate with the RAN/gNB regarding the potentially supported RRC state(s). Thus, in 704, the CN may provide a MBMS session join request message to the RAN/gNB. In this scenario, the CN may not provide an indication of any requested supported RRC state(s) to the RAN % gNB. In 706, the RAN/gNB may provide a MBMS session setup response, in which the RAN/gNB may indicate the supported RRC state(s) for each of the requested MBMS services (e.g., connected only for TMGI #1 and all RRC states for TMGI #2, in the illustrated example). In 708, the CN may provide (e.g., using NAS signaling) a MBMS session join accept message to the UE, which may indicate the corresponding RRC state(s) for the MBMS service provision, and potentially may include a cell list associated with the MBMS service provision, in 710, the CN may transmit the MBMS services to the UE. In 712, the UE may leave the MBMS session. In 714, the CN may inform the RAN/gNB that the UE has left the RRC session. In 716, the RAN/gNB may release the RRC connection of the UE, and the UE may operate in idle or inactive mode.

Note that in either such scenario, if the CN or RAN decides to change the supported RRC state(s) or the potential cell list for a MBMS session joined by the UE, the CN may inform the UE with the updated information for the MBMS service. Note further that it may be the case that the RAN/gNB may choose not to release a UE from RRC connected if the network is providing a MBMS service to the UE that is only provided in RRC connected before the UE leaves the MBMS session, at least in some instances.

Figure 8:
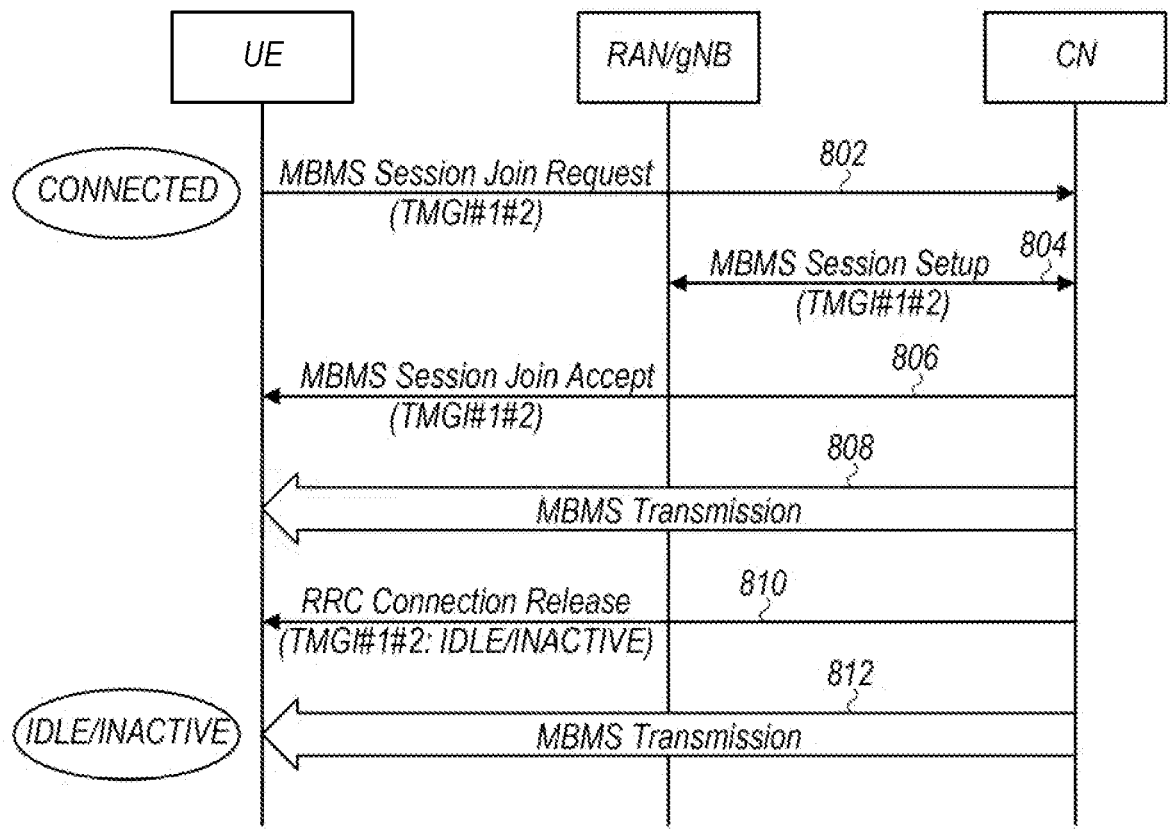
Figure 9:
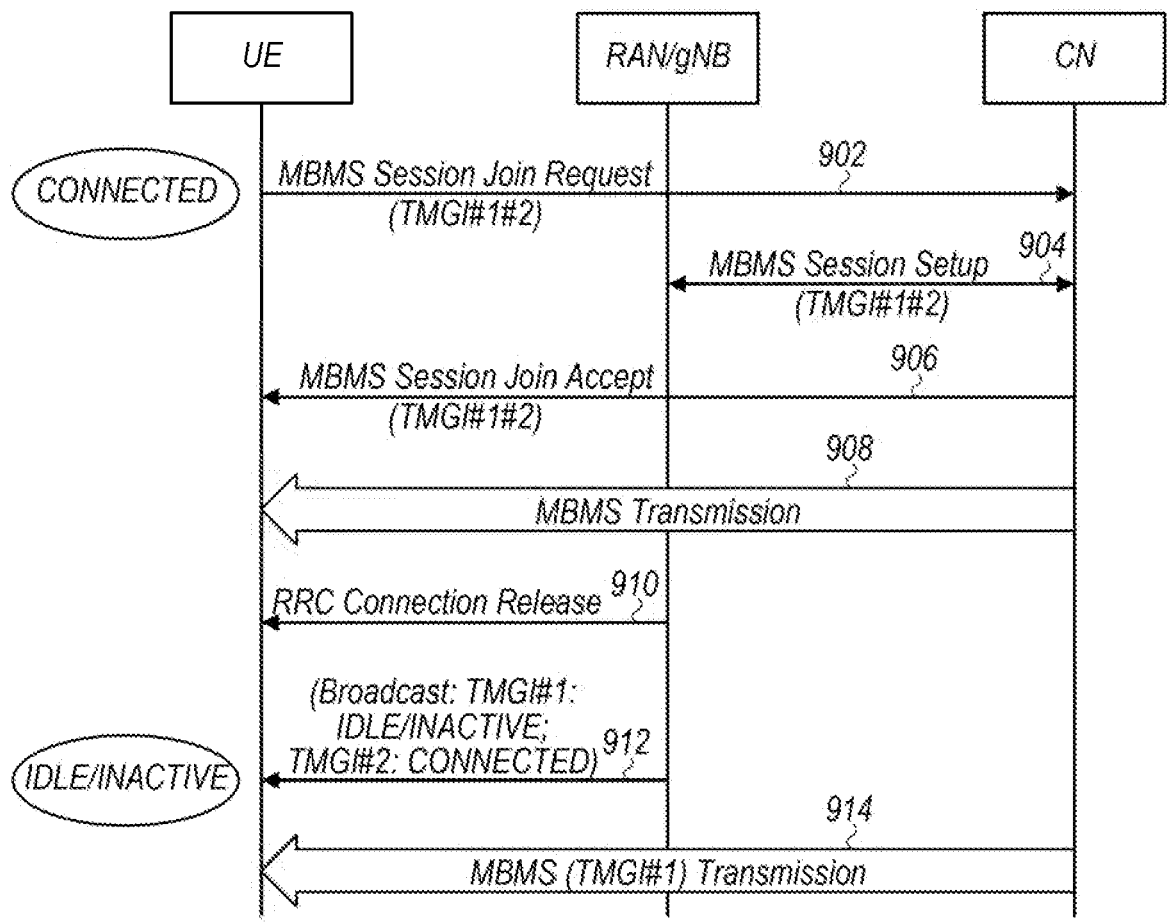

FIGS. 8-9 are signal flow diagrams illustrating aspects of example scenarios in which the RAN controls whether MBMS services are provided in idle/active/connected, according to some embodiments. In the scenario of FIG. 8, in 802, a UE may provide a MBMS session join request (indicating a request to join two MBMS sessions. "TMGI #1" and "TMGI #2") to the CN. In 804, the CN may perform MBMS session setup with the RAN/gNB. In 806, the CN may provide (e.g., using NAS signaling) a MBMS session join accept message to the UE, which may not indicate information regarding in which RRC state(s) MBMS service provision is supported. In 808, the CN may transmit the MBMS services to the UE. In 810, the RAN/gNB may release the RRC connection of the UE, and the UE may operate in idle or inactive mode. The RAN/gNB may provide an indication as part of the RRC connection release message whether the MBMS services are supported in idle/inactive (e.g., both TMGI #1 and TMGI #2 may be supported in idle/inactive, in the illustrated example). Such configuration can be provided per MBMS service, at least in some instances. In 812, the UE may continue receiving the MBMS transmission while operating in the idle or inactive mode.

In the scenario of FIG. 9, in 902, a UE may provide a MBMS session join request (indicating a request to join two MBMS sessions, "TMGI #1" and "TMGI #2") to the CN. In 904, the CN may perform MBMS session setup with the RAN/gNB. In 906, the CN may provide (e.g., using NAS signaling) a MBMS session join accept message to the UE, which may not indicate information regarding in which RRC state(s) MBMS service provision is supported. In 908, the CN may transmit the MBMS services to the UE. In 910, the RAN/gNB may release the RRC connection of the UE, and the UE may operate in idle or inactive mode. In 912, the RAN/gNB may provide a boradcast indication of whether the MBMS services are supported in idle/inactive (e.g., TMGI #1 may be supported in idle/inactive, while TMGI #2 may only be supported in connected, in the illustrated example). Such configuration can be provided per MBMS service, at least in some instances. In 914, the UE may continue receiving the MBMS transmission that is supported in idle/inactive (TMGI #1) while operating in the idle or inactive mode.

Figure 10:
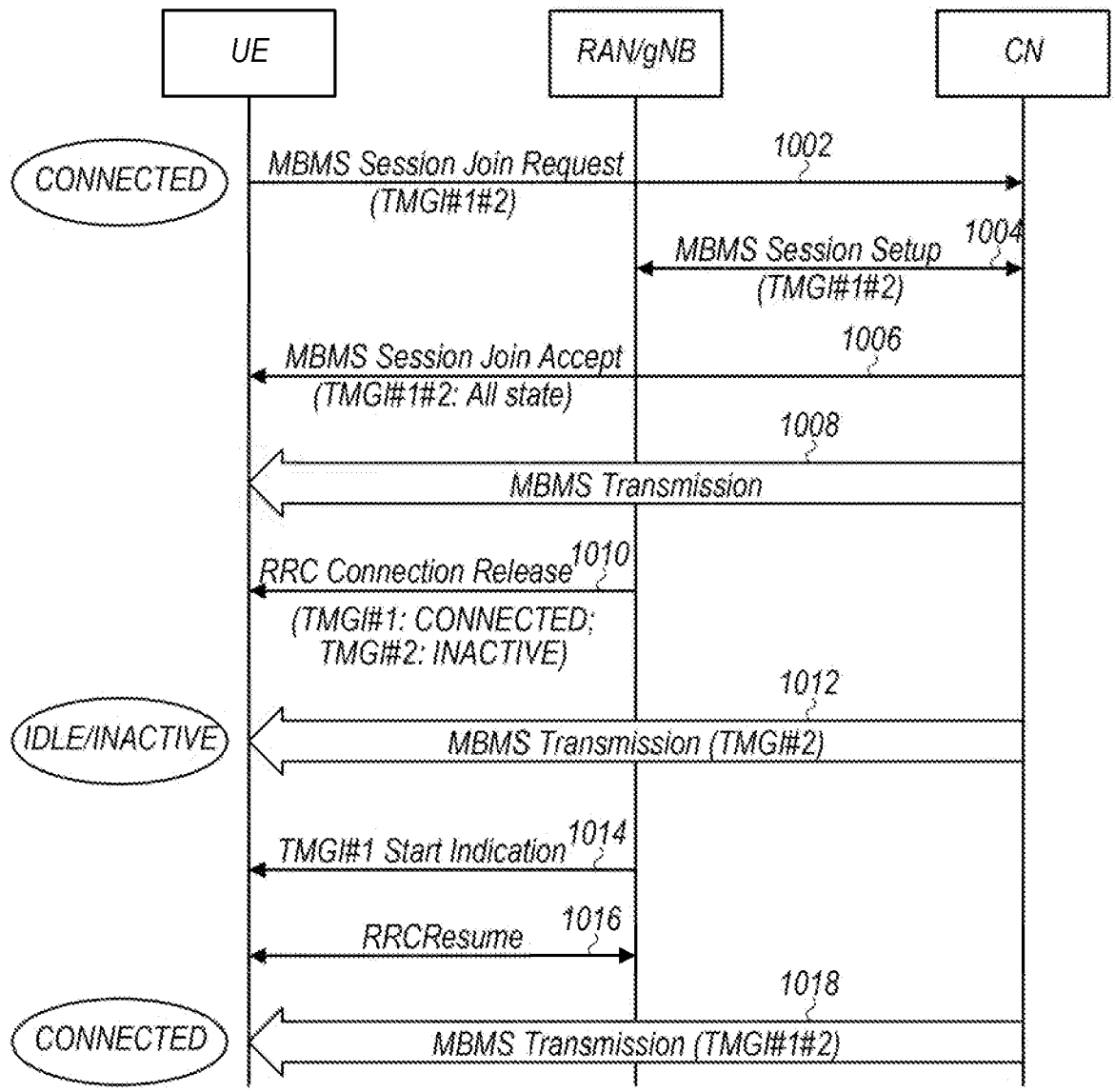
Figure 11:
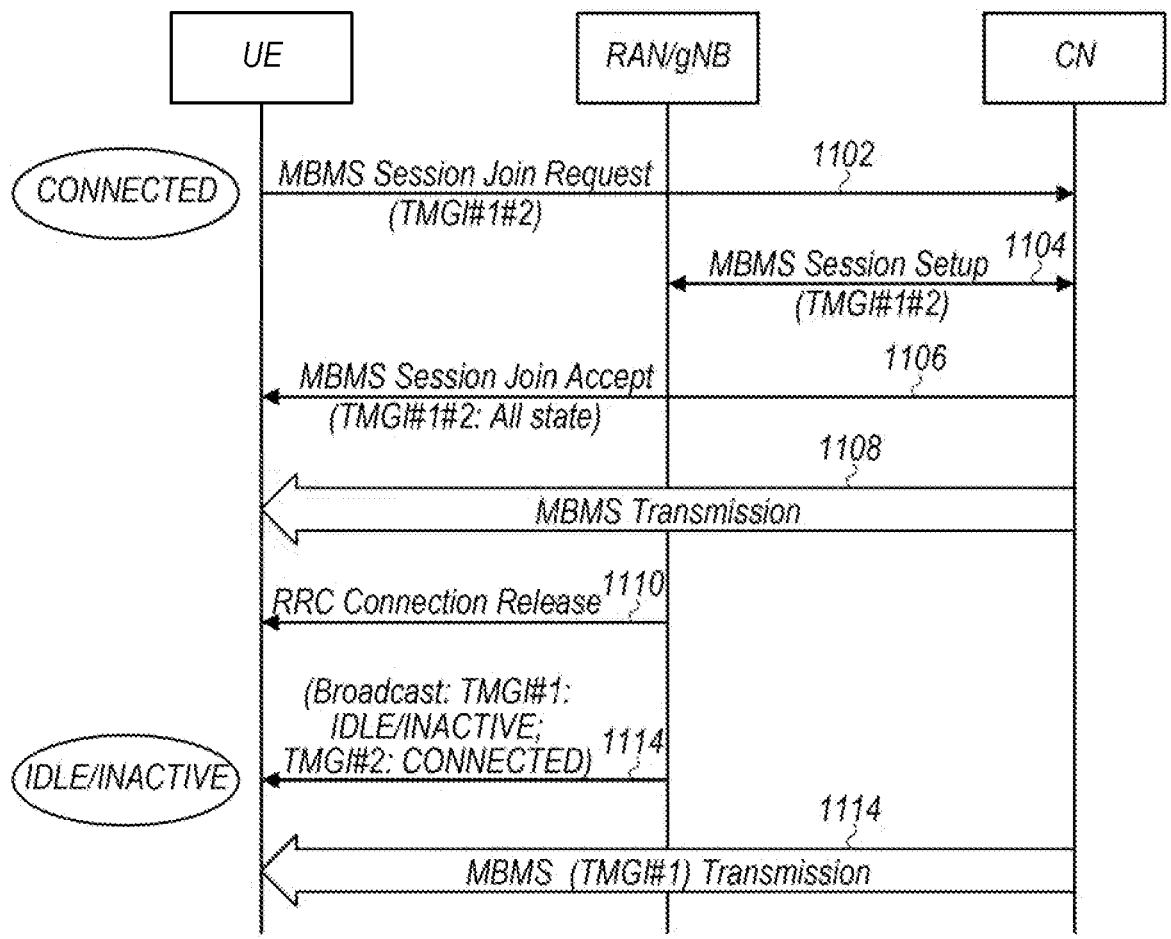

FIGS. 10-11 are signal flow diagrams illustrating aspects of example scenarios in which both the CN and the RAN control whether MBMS services are provided in idle/active/connected, according to some embodiments. In the scenario of FIG. 10, in 1002, a UE may provide a MBMS session join request (indicating a request to join two MBMS sessions, "TMGI #1" and "TMGI #2") to the CN. In 1004, the CN may perform MBMS session setup with the RAN/gNB. In 1006, the CN may provide (e.g., using NAS signaling) a MBMS session join accept message to the UE, which may indicate information regarding in which RRC state(s) MBMS service provision is supported by the CN (e.g., all RRC states, in the illustrated example). In 1008, the CN may transmit the MBMS services to the UE. In 1010, the RAN/gNB may release the RRC connection of the UE, and the UE may operate in idle or inactive mode. The RAN/gNB may provide an indication as part of the RRC connection release message whether the MBMS services are supported by the RAN/gNB in idle/inactive (e.g., TMGI #1 may only be supported in connected and TMGI #2 may be supported in inactive, in the illustrated example). Such configuration can be provided per MBMS service, at least in some instances. In 1012, the UE may continue receiving the TMGI #2 MBMS transmission while operating in the inactive mode. In 1014, the RAN/gNB may provide a TMGI #1 start indication to the UE. Since provision of TMGI #1 in idle/inactive is not supported by the RAN/gNB in the illustrated scenario, in 1016, the UE and the RAN/gNB may perform a RRC resume procedure. In 1018, again operating in RRC connected, the UE may receive MBMS services from the CN for both TMGI #1 and TMGI #2.

In the scenario of FIG. 11, in 1102, a UE may provide a MBMS session join request (indicating a request to join two MBMS sessions, "TMGI #1" and "TMGI #2") to the CN. In 1104, the CN may perform MBMS session setup with the RAN/gNB. In 1106, the CN may provide (e.g., using NAS signaling) a MBMS session join accept message to the UE, which may indicate information regarding in which RRC state(s) MBMS service provision is supported by the CN (e.g., all RRC states, in the illustrated example). In 1108, the CN may transmit the MBMS services to the UE. In 1110, the RAN/gNB may release the RRC connection of the UE, and the UE may operate in idle or inactive mode. In 1112, the RAN/gNB may provide a broadcast indication of whether the MBMS services are supported by the RAN/gNB in idle/inactive (e.g., TMGI #1 may be supported in idle/inactive and TMGI #2 may only be supported in connected, in the illustrated example). Such configuration can be provided per MBMS service, at least in some instances. In 1114, the UE may continue receiving the TMGI #1 MBMS transmission while operating in the idle/inactive mode.

Figure 12:
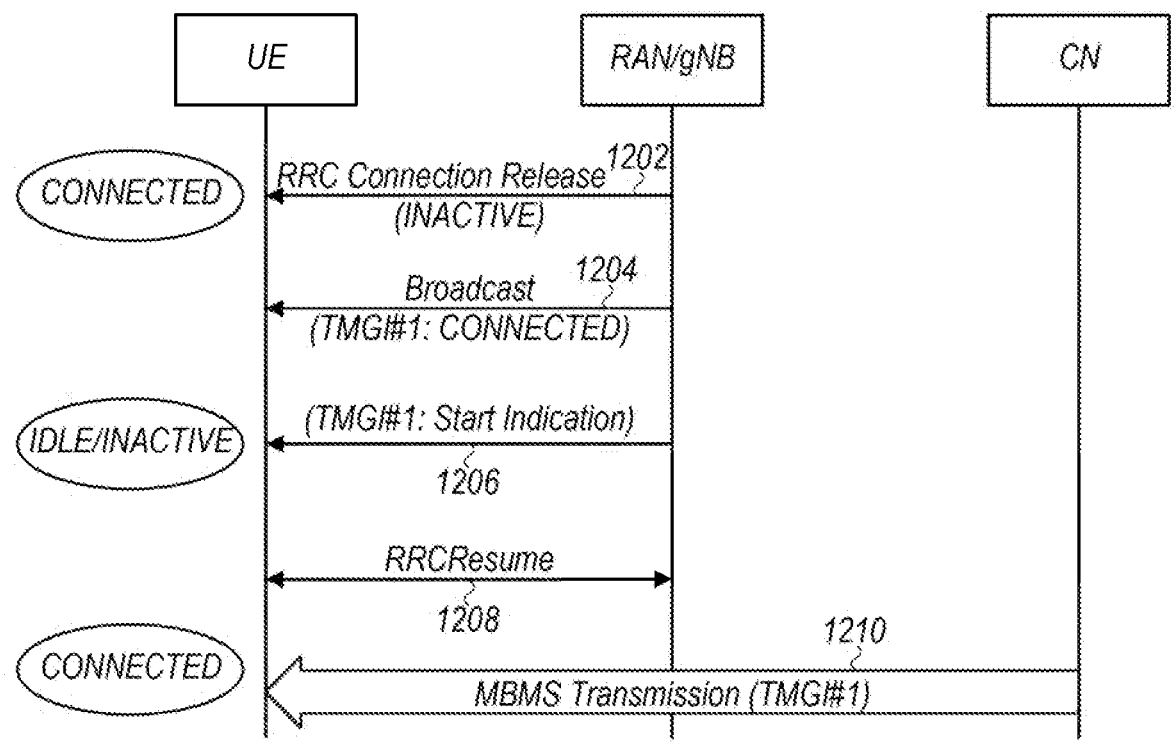
FIGS. 12-14 are signal flow diagrams illustrating aspects of exemplary possible techniques for wireless device operation supporting broadcast and multicast service reception while in Idle and Inactive modes, according to some embodiments.
Figure 13:
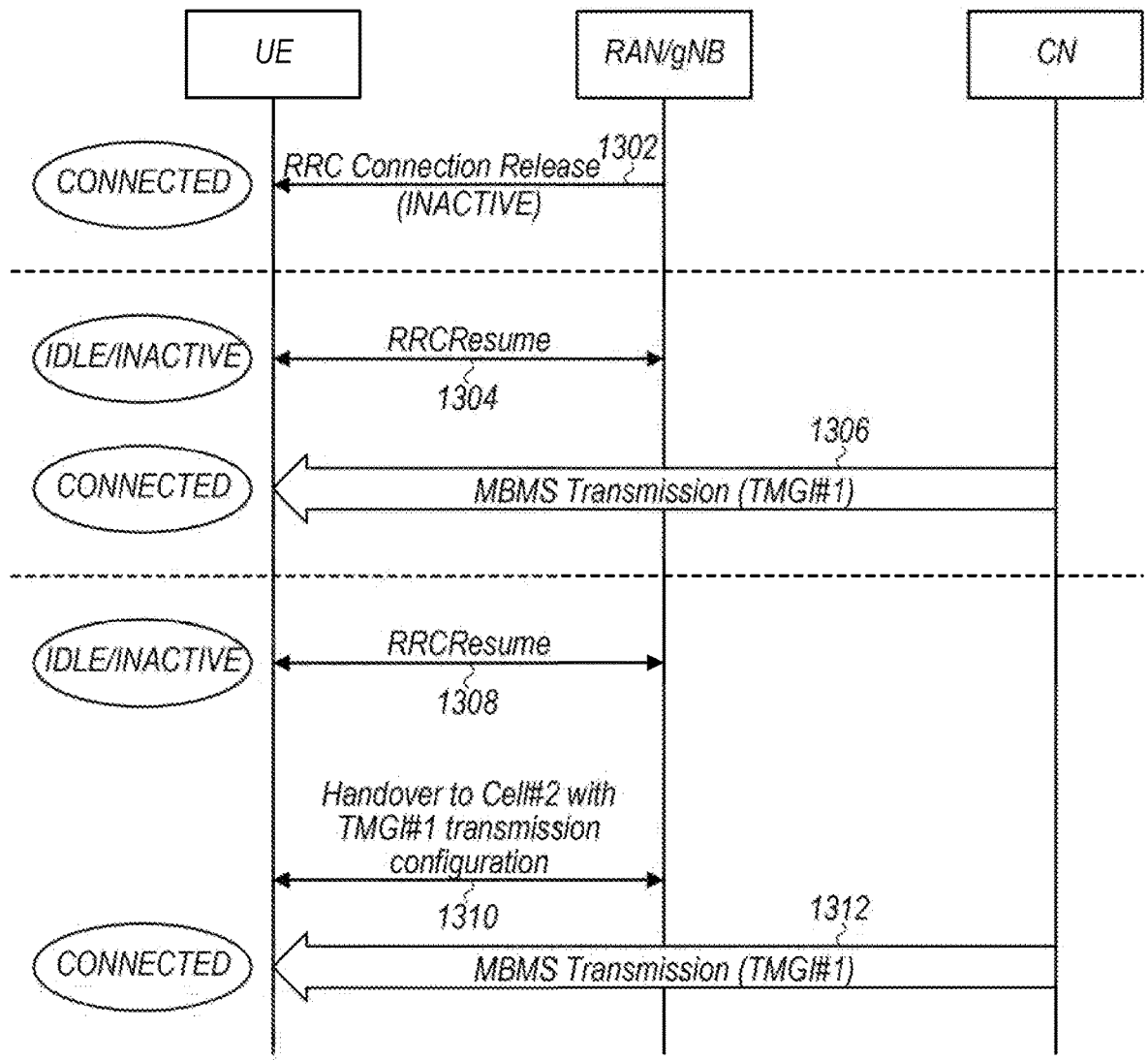
Figure 14:
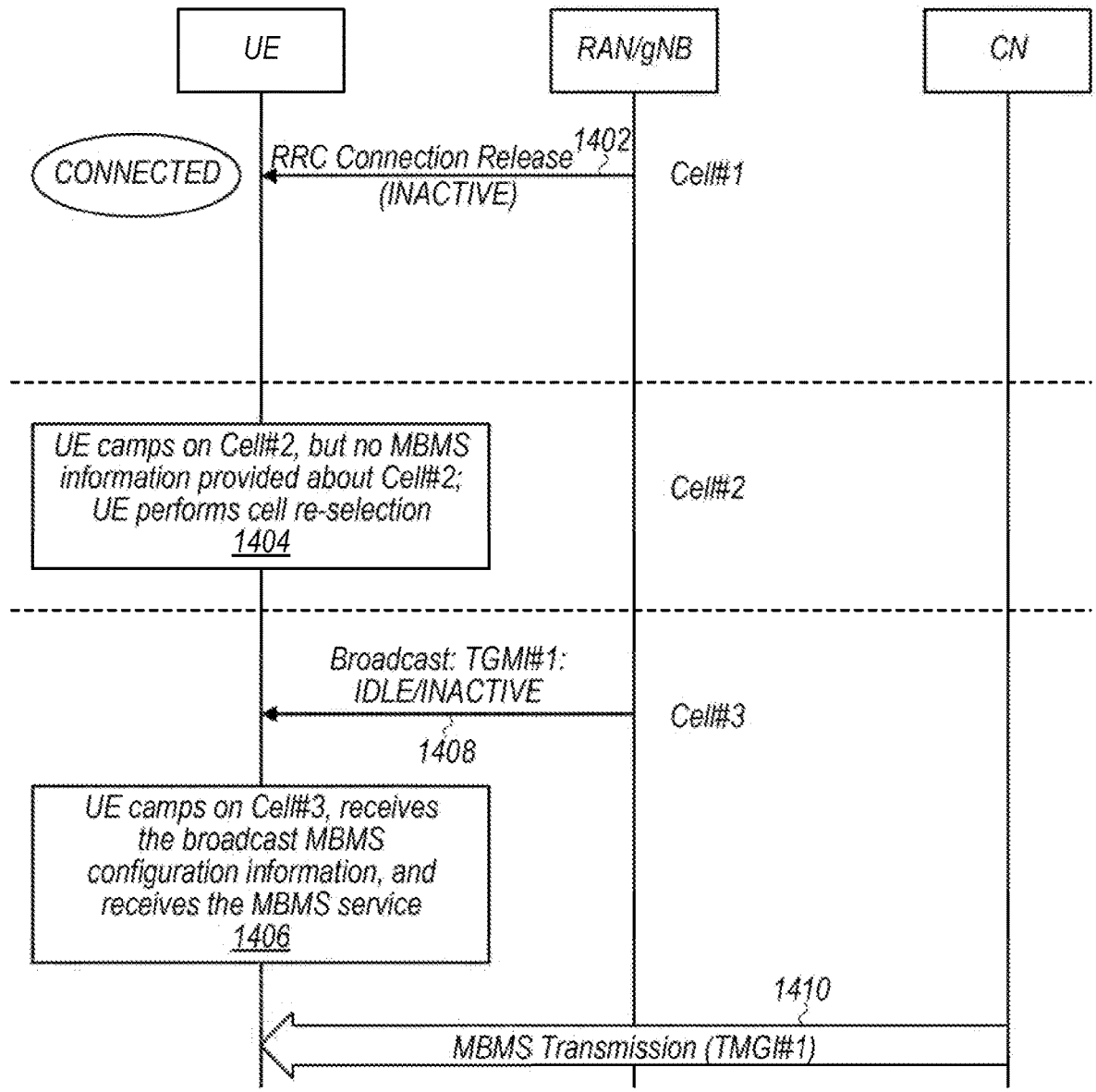

As previously noted, there may be various possible options for UE operation relating to the availability or unavailability of MBMS services in one or more of idle/inactive/connected. FIGS. 12-14 are signal flow diagrams illustrating examples of several such possible options, according to some embodiments. FIG. 12 illustrates an example scenario in which provision of a MBMS service that a UE is interested in receiving is available from its serving cell in RRC connected but not in RRC idle or RRC inactive states. In such a scenario, if the MBMS service is being provided while the UE is idle or inactive, the UE may resume the RRC connection to receive the MBMS service, and may indicate that the purpose of resuming the RRC connection is to receive the MBMS service. In particular, as shown, in 1202, the RAN/gNB may release a RRC connection that had been established between the UE and the RAN/gNB. In 1204, the RAN/gNB may provide a broadcast indication that a MBMS service (identified using a particular TMGI, "TMGI #1") is only available in RRC connected. In 1206, while the UE is in RRC inactive, the RAN/gNB may provide a start indication for TMGI #1. In 1208, accordingly, the UE and the RAN/gNB may perform a RRC resume procedure, so that in 1210 the UE can receive the MBMS transmission for TMGI #1. Note that the UE may indicate the cause for resuming the RRC connection may setting a resume cause field to MBMS reception in a RRCResumeReq message, and including the TMGI for the MBMS service of interest in the RRCResumeReq message as well as in a RRCResumeComplete message, at least according to some embodiments.

FIG. 13 illustrates an example scenario in which provision of a MBMS service that a UE is interested in receiving is not available in RRC idle or RRC inactive states from the current serving cell of the UE. In such a scenario, if the MBMS service is being provided while the UE is idle or inactive, the UE may resume the RRC connection, including indicating that the purpose of resuming the RRC connection is to receive the MBMS service, and the network may decide whether to provide the MBMS service via the same cell or to handover the UE to another cell that can provide the MBMS service. In particular, as shown, in 1302, the RAN/gNB may release a RRC connection that had been established between the UE and the RAN/gNB. In 1304, the UE and the RAN/gNB may perform a RRC resume procedure, in which the UE may indicate the cause for resuming the RRC connection, e.g., by setting a resume cause field to MBMS reception in a RRCResumeReq message, and including the TMGI for the MBMS service of interest in the RRCResumeReq message as well as in a RRCResumeComplete message. In 1306, the UE may receive the MBMS transmission for a TMGI ("TMGI #1). As another possibility (e.g., at a different time, or as an alternative), in 1308, the UE and the RAN/gNB may perform a RRC resume procedure, in which the UE may indicate the cause for resuming the RRC connection, in 1310, the RAN/gNB and the UE may perform handover of the UE to another cell, e.g., with transmission configuration for the TMGI, and in 1312, the UE may receive the MBMS transmission for the TMGI from the network (e.g., via the cell to which handover was performed).

FIG. 14 illustrates an example scenario in which provision of a MBMS service that a UE is interested in receiving is not available in RRC connected, RRC idle, or RRC inactive states from the current serving cell of the UE. In such a scenario, the UE may perform cell re-selection to camp on another cell from which the UE may be able to receive the MBMS service. In particular, as shown, in 1402, a first cell ("cell #1") of the RAN may release a RRC connection that had been established between the UE and the RAN/gNB. In 1404, the UE may camp on a second cell ("cell #2") of the RAN, but no MBMS information may be provided about the second cell, so the UE may perform cell re-selection. In 1406, the UE may camp on a third cell (cell #3) of the RAN, which may, in 1408, broadcast MBMS information for the MBMS service ("TGMI #1") indicating that the MBMS service is supported in idle/inactive. In 1410, the UE may receive the MBMS transmission for the TMGI from the network (e.g., via the third cell) while idle or inactive.

In order to support the ability of a UE to perform cell re-selection in such a manner that the UE can effectively receive MBMS services in which the UE is interested, it may be useful to provide techniques to assist the UE to prioritize cells that can provide the MBMS service(s) of interest to the UE during the cell re-selection procedure. Such prioritization can be controlled (at least in part) by the network. For example, the network may control the idle/inactive UE mobility area for MBMS reception by configuring whether the UE is allowed to priorize cells/frequencies based on their MBMS support during cell re-selection, e.g., using a 1-bit yes/no indicator in broadcast or dedicated control information provided to the UE, or using any of various other possible mechanisms.

In some instances, the network may be able to configure a cell list and/or frequency list for MBMS reception, e.g., which may indicate cells that support MBMS reception, possibly including information indicating in which RRC states MBMS reception is supported by those cells/frequencies. In some instances, such a cell/frequency list could be provided on a per MBMS service basis.

In some instances, the network may be able to configure the MBMS dedicated cell/frequency priority framework for the cell re-selection. For example, when the UE performs cell re-selection, if the UE is interested in a MBMS service, the UE may prioritize selecting a cell that supports the MBMS service for cell camping, e.g., among cells that meet signal strength and/or signal quality criteria (e.g., 3GPP specified S-critera). There may be different priorities configured for different cells depending on the RRC state(s) in which the MBMS service is supported. For example, as one possibility, a UE may perform MBMS specific cell re-selection according to three prioritization levels. Such priority levels could include a "high" priority level for cells that can provide the MBMS service in all of idle/inactive/connected, a "medium" priority level for cells that can provide the MBMS service in connected, and a "low" priority level for cells that cannot provide the MBMS service. In such a scenario, the UE may first prioritize a cell with high priority for selection; if no high priority cell is selected, the UE may prioritize a cell with medium priority for selection; and if no medium priority cell is selected, the UE may select any cell including those with low priority.

As another possibility, a UE may perform MBMS specific cell re-selection using two prioritization levels. Such priority levels could include a "high" priority level for cells that can provide the MBMS service in at least one RRC state, and a "low" priority level for cells that cannot provide the MBMS service. In such a scenario, the UE may first prioritize a cell with high priority for selection: if no high priority cell is selected, the UE may select any cell including those with low priority. Note that numerous other prioritization frameworks for performing cell re-selection are also possible.

Configuration of such cell/frequency list and/or cell re-selection prioritization framework information could be provided for reception of all MBMS services collectively, or for each MBMS service, among various possibilities. The configuration could be provided via AS or NAS signaling, and via dedicated configuration information or via system information. For a system information based approach, the system information could be provided in an on-demand SIB and/or a broadcasted SIB. Further, any of the preceding network control mechanisms for MBMS reception in idle/inactive may be performed separately or together for RRC idle and RRC inactive states.

As a further (additional or alternative) possibility, in some instances the network may provide MBMS information for neighbor cells/frequencies, via dedicated signaling or broadcast information. Including MBMS information as part of neighbor cells/frequencies configuration may help the UE understand where it can acquire the MBMS service(s) that the UE is interested in receiving.

Figure 15:
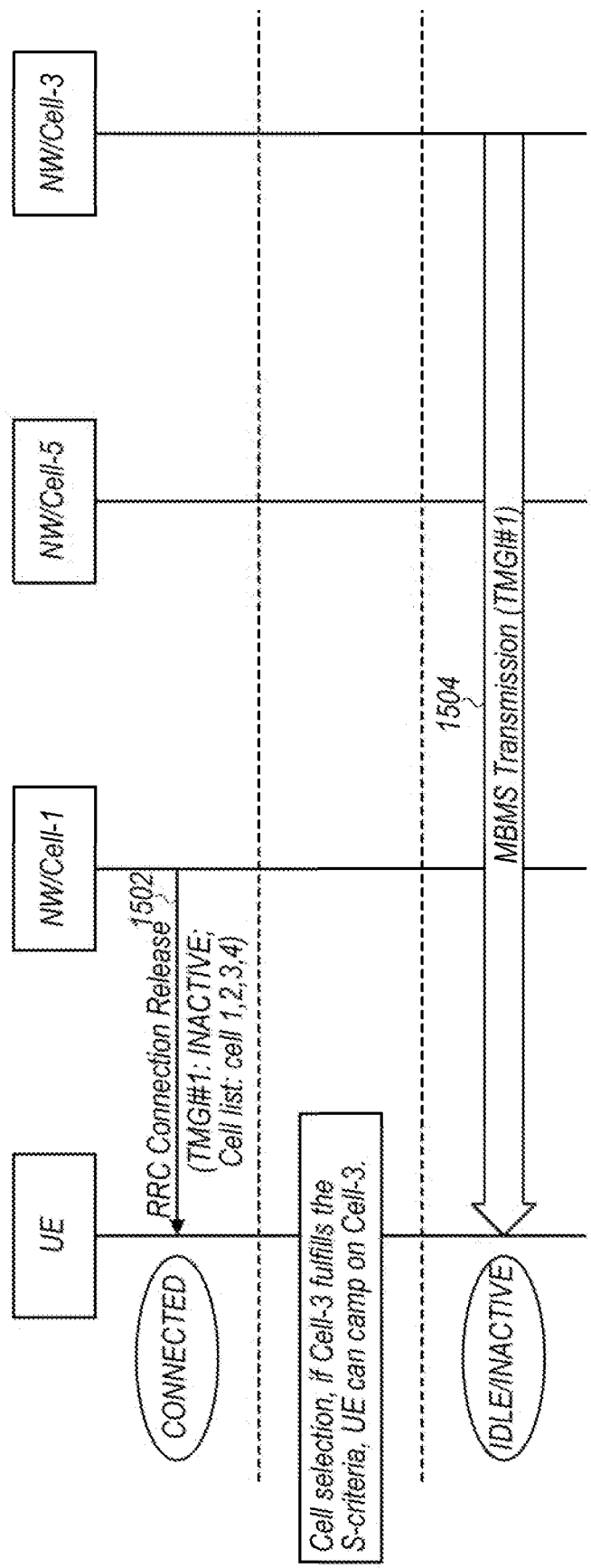
FIG. 15 is a signal flow diagram illustrating aspects of an exemplary possible technique for a wireless device to handle mobility in conjunction with broadcast and multicast service reception while in Idle and Inactive modes, according to some embodiments.

FIG. 15 is a signal flow diagram illustrating exemplary aspects of how such MBMS based cell re-selection could be performed by a UE, according to some embodiments. As shown, in the illustrated example, in 1502, a first cell ("cell-1") of a cellular network may release a RRC connection with the UE. The UE may be released to RRC inactive, and the network may provide a cell list for the MBMS service ("TMGI #1") that the UE is interested in receiving, which may include cells 1, 2, 3, and 4. Accordingly, when the UE performse cell re-selection, if cell-5 and cell-3 are available and fullfil the S-criteria, the UE may select cell-3 to camp on. In 1504, the UE may receive the MBMS transmission for TMGI #1 while in RRC inactive via cell-3.

As another possible aspect of a framework for supporting MBMS reception in idle/inactive, it may be useful to provide techniques for configuration provision for MBMS reception in idle/inactive. For example, for L1/L2 configuration for MBMS reception in RRC idle and RRC inactive states, there may be multiple options for providing this configuration information. FIGS. 16-19 illustrate exemplary aspects of several such options, at least according to some embodiments.

Figure 16:
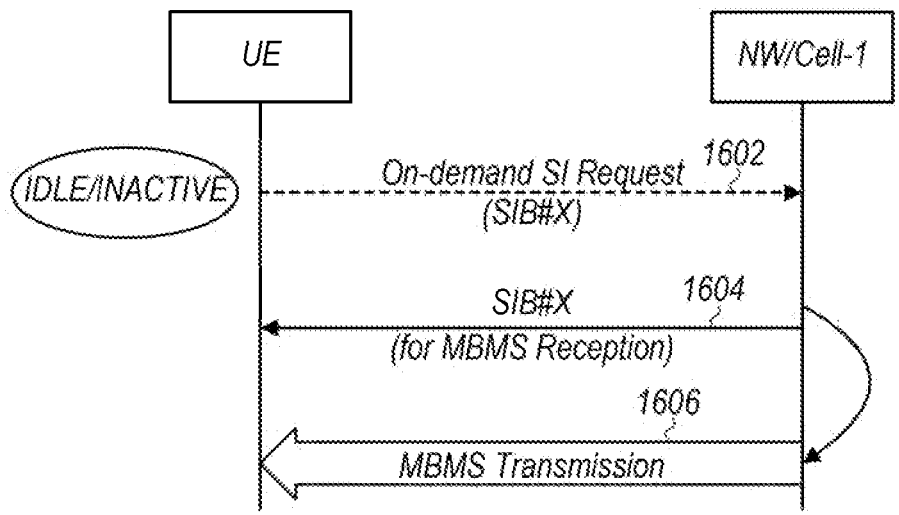
FIGS. 16-19 are signal flow diagrams illustrating aspects of exemplary possible techniques for providing configuration information to support broadcast and multicast service reception while in Idle and Inactive modes.

FIG. 16 illustrates an approach in which the configuration information is provided via system information. As shown, in 1602, while idle or inactive, a UE may provide an on-demand system information (SI) request (e.g., for "SIB #X", which may include configuration information for MBMS reception) to a cellular network (e.g., via a first cell, "cell-1"). In 1604, the network may provide the requested system information. In 1606, the UE may receive a MBMS transmission from the network, e.g., using the configuration provided in the requested system information.

Figure 17:
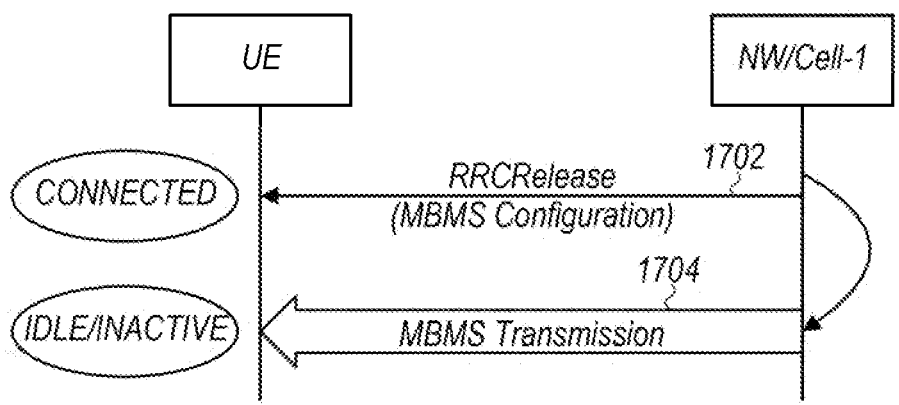

FIG. 17 illustrates an approach in which the configuration information is provided via RRCRelease message when the network releases the UE to idle/inactive. As shown, in 1702, the network may provide a RRCRelease message to the UE, which may include configuration information for MBMS reception. In 1704, the UE may receive a MBMS transmission from the network, e.g., using the configuration provided in the RRCRelease message.

Figure 18:
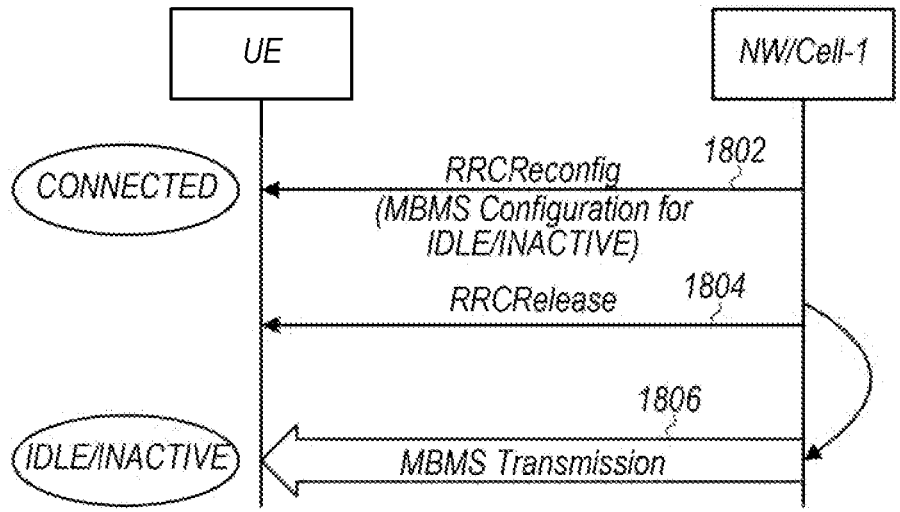

FIG. 18 illustrates an approach in which the configuration information is provided via dedicated configuration information while the UE is in the RRC connected state, and the network explicitly indicates whether the MBMS configuration information can be used in idle/inactive, as well as potentially providing an applicable cell list. As shown, in 1802, the network may provide a RRCReconfig message to the UE while the UE is RRC connected, which may include configuration information for MBMS reception in idle/inactive. In 1804, the network may release the RRC connection, e.g., by providing a RRCRelease message to the UE. In 1806, the UE may receive a MBMS transmission from the network, e.g., using the configuration provided in the RRCreconfig message.

Figure 19:
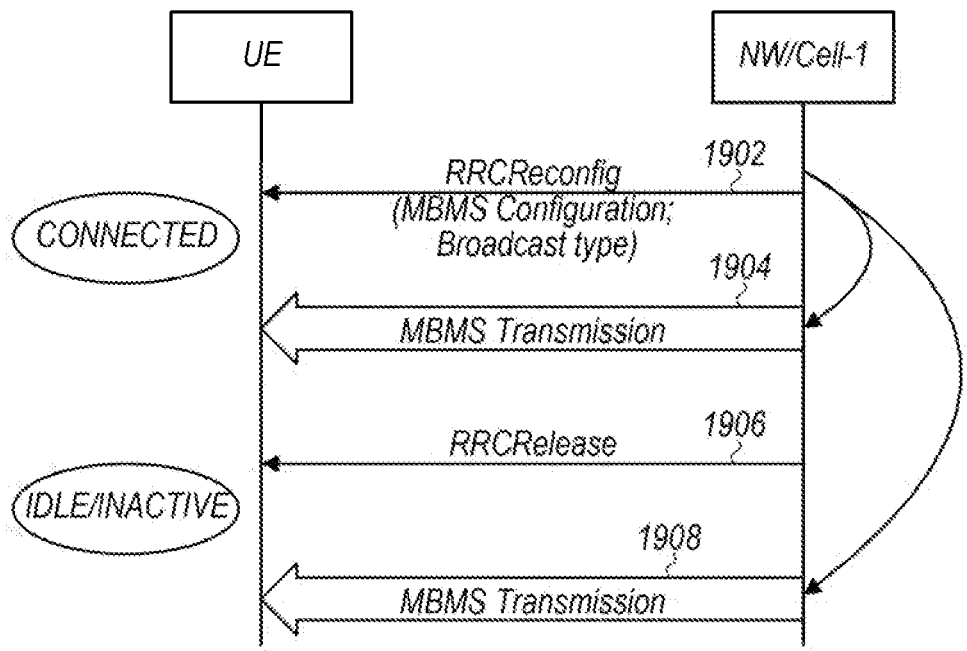

FIG. 19 illustrates another approach in which the configuration information is provided via dedicated configuration information while the UE is in the RRC connected state, where if the network marks the configuration as being for broadcast type MBMS service, the UE can store the configuration and apply it in idle/inactive for MBMS reception while the UE stays in the same cell. As shown, in 1902, the network may provide a RRCReconfig message to the UE while the UE is RRC connected, which may include configuration information for broadcast type MBMS reception. In 1904, the network may provide the MBMS transmission, which the UE may receive while RRC connected. In 1906, the network may release the RRC connection, e.g., by providing a RRCRelease message to the UE. In 1908, the UE may continue to be able to receive the MBMS transmission from the network while idle/inactive, e.g., using the configuration provided in the RRCReconfig message.

In the following further exemplary embodiments are provided.

One set of embodiments may include a baseband processor configured to perform operations comprising: establishing a wireless link with a cellular base station of a cellular network; receiving information indicating whether provision of a broadcast or multicast service in one or more of radio resource control (RRC) inactive mode or RRC idle mode is supported by the cellular network; and receiving the broadcast or multicast service in one or more of RRC inactive mode or RRC idle mode based at least in part on the information indicating whether provision of the broadcast or multicast service in one or more of RRC inactive mode or RRC idle mode is supported by the cellular network.

According to some embodiments, the information indicating whether provision of the broadcast or multicast service in one or more of RRC inactive mode or RRC idle mode is supported by the cellular network includes information received from a core network element of the cellular network via non access stratum signaling.

According to some embodiments, the information indicating whether provision of the broadcast or multicast service in one or more of RRC inactive mode or RRC idle mode is supported by the cellular network includes information received from a cellular base station of the cellular network via access stratum signaling.

According to some embodiments, wherein the baseband processor is further configured to perform operations comprising: receiving information indicating one or more cells or frequencies that support provision of the broadcast or multicast service in one or more of RRC inactive mode or RRC idle mode.

According to some embodiments, the baseband processor is further configured to perform operations comprising: receiving information indicating cell prioritization information for performing cell re-selection based at least in part on cell support for broadcast or multicast service.

According to some embodiments, the baseband processor is further configured to perform operations comprising: receiving layer 1 and layer 2 configuration information for broadcast and multicast service reception in one or more of RRC inactive mode or RRC idle mode.

Another set of embodiments may include a wireless device, comprising: an antenna; a radio operably coupled to the antenna; and a processor operably coupled to the radio; wherein the wireless device is configured to: establish a wireless link with a cellular base station; and receive information indicating whether provision of a broadcast or multicast service in one or more of radio resource control (RRC) inactive mode or RRC idle mode is supported by the cellular network.

According to some embodiments, the information indicating whether provision of the broadcast or multicast service in one or more of RRC inactive mode or RRC idle mode is supported by the cellular network indicates that a current serving cell of the wireless device does support provision of the broadcast or multicast service in one or more of RRC inactive mode or RRC idle mode, wherein the wireless device is further configured to: receive the broadcast or multicast service while in RRC inactive mode or RRC idle mode.

According to some embodiments, the information indicating whether provision of the broadcast or multicast service in one or more of RRC inactive mode or RRC idle mode is supported by the cellular network indicates that a current serving cell of the wireless device does not support provision of the broadcast or multicast service in RRC inactive mode or RRC idle mode, wherein the wireless device is further configured to: attempt to establish a RRC connection with the current serving cell while in RRC inactive mode or RRC idle mode based at least in part on the indication that the current serving cell of the wireless device does not support provision of the broadcast or multicast service in RRC inactive mode or RRC idle mode.

According to some embodiments, the information indicating whether provision of the broadcast or multicast service in one or more of RRC inactive mode or RRC idle mode is supported by the cellular network indicates that a current serving cell of the wireless device does not support provision of the broadcast or multicast service in RRC connected mode, RRC inactive mode, or RRC idle mode, wherein the wireless device is further configured to: perform cell re-selection while in RRC inactive mode or RRC idle mode based at least in part on the indication that the current serving cell of the wireless device does not support provision of the broadcast or multicast service in RRC connected mode, RRC inactive mode, or RRC idle mode.

According to some embodiments, the wireless device is further configured to: receive information indicating one or more cells or frequencies that support provision of the broadcast or multicast service; receive cell prioritization information for performing cell re-selection based at least in part on cell support for broadcast or multicast service: and perform cell re-selection, wherein cells that support broadcast or multicast service are prioritized for the cell re-selection based at least in part on the cell prioritization information and the information indicating one or more cells or frequencies that support provision of the broadcast or multicast service.

According to some embodiments, the information indicating whether provision of a broadcast or multicast service in one or more of RRC inactive mode or RRC idle mode is supported by the cellular network includes information received from one or more of: a cellular base station, via RRC signaling; or a cellular core network element, via non access stratum signaling.

Still another set of embodiments may include a cellular network element of a cellular network, comprising: a network interface; and a processor communicatively coupled to the network interface: wherein the cellular network element is configured to: determine whether provision of a broadcast or multicast service in one or more of radio resource control (RRC) inactive mode or RRC idle mode is supported by the cellular network element; and provide information to a wireless device indicating whether provision of a broadcast or multicast service in one or more of RRC inactive mode or RRC idle mode is supported by the cellular network element.

According to some embodiments, the cellular network element includes a cellular core network element, wherein the information indicating whether provision of the broadcast or multicast service in one or more of RRC inactive mode or RRC idle mode is supported by the cellular network element is provided via non access stratum signaling.

According to some embodiments, the cellular network element is further configured to: request information from a cellular base station serving the wireless device indicating whether the cellular base station supports provision of the broadcast or multicast service in one or more of RRC inactive mode or RRC idle mode; and receive information from the cellular base station serving the wireless device indicating whether the cellular base station supports provision of the broadcast or multicast service in one or more of RRC inactive mode or RRC idle mode, wherein whether provision of the broadcast or multicast service in one or more of RRC inactive mode or RRC idle mode is supported by the cellular network element is determined based at least in part on the information received from the cellular base station serving the wireless device.

According to some embodiments, the cellular network element includes a cellular base station, wherein the information indicating whether provision of the broadcast or multicast service in one or more of RRC inactive mode or RRC idle mode is supported by the cellular network is provided via access stratum signaling.

According to some embodiments, the information indicating whether provision of the broadcast or multicast service in one or more of RRC inactive mode or RRC idle mode is supported by the cellular network is provided in one or more of: dedicated RRC signaling; or broadcast system information.

According to some embodiments, the cellular network element is further configured to: provide information to the wireless device indicating one or more cells or frequencies that support provision of the broadcast or multicast service in one or more of RRC inactive mode or RRC idle mode.

According to some embodiments, the cellular network element is further configured to: provide cell prioritization information for performing cell re-selection based at least in part on cell support for broadcast or multicast service to the wireless device.

According to some embodiments, the cellular network element is further configured to: provide layer 1 and layer 2 configuration information for broadcast and multicast service jo reception in one or more of RRC inactive mode or RRC idle mode to the wireless device.

A further exemplary embodiment may include a method, comprising: performing, by a device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a device to perform any or all of the elements of any of the preceding examples.

Another exemplary set of embodiments may include a baseband processor configured to perform operations comprising any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A baseband processor configured to:
receive information, from a cellular base station of a cellular network, indicating one or more neighbor cells that support provision of a broadcast or multicast service in one or more of radio resource control (RRC) inactive mode or RRC idle mode, the one or more neighbor cells comprising at least a first cell;
perform cell re-selection while in RRC inactive mode or RRC idle mode based at least in part on the information; and
receive the broadcast or multicast service while in RRC inactive mode or RRC idle mode on the first cell.

2. The baseband processor of claim 1,
wherein the information indicates that a current serving cell does support provision of the broadcast or multicast service in one or more of RRC inactive mode or RRC idle mode.

3. The baseband processor of claim 1,
wherein the information indicates that a current serving cell does not support provision of the broadcast or multicast service in RRC inactive mode or RRC idle mode, wherein the baseband processor is further configured to:
attempt to establish a RRC connection with the current serving cell while in RRC inactive mode or RRC idle mode based at least in part on the indication that the current serving cell does not support provision of the broadcast or multicast service in RRC inactive mode or RRC idle mode.

4. The baseband processor of claim 1,
wherein cells that support broadcast or multicast service are prioritized for the cell re-selection.

5. The baseband processor of claim 1,
wherein the information is received from one or more of:
a cellular base station, via RRC signaling; or
a cellular core network element, via non access stratum signaling.

6. A method, comprising
receive information, from a cellular base station of a cellular network, indicating one or more neighbor cells that support provision of a broadcast or multicast service in one or more of radio resource control (RRC) inactive mode or RRC idle mode;
perform cell re-selection while in RRC inactive mode or RRC idle mode based at least in part on the information; and
receive the broadcast or multicast service while in RRC inactive mode or RRC idle mode on a first cell.

7. The method of claim 6,
wherein the information indicates that a current serving cell does support provision of the broadcast or multicast service in one or more of RRC inactive mode or RRC idle mode.

8. The method of claim 6,
wherein the information indicates that a current serving cell does not support provision of the broadcast or multicast service in RRC inactive mode or RRC idle mode.

9. The method of claim 8, further comprising:
attempt to establish a RRC connection with the current serving cell while in RRC inactive mode or RRC idle mode based at least in part on the indication that the current serving cell does not support provision of the broadcast or multicast service in RRC inactive mode or RRC idle mode.

10. The method of claim 6,
wherein cells that support broadcast or multicast service are prioritized for the cell re-selection.

11. The method of claim 6,
wherein the information is received from a cellular base station, via RRC signaling.

12. The method of claim 6,
wherein the information is received from a cellular core network element, via non access stratum signaling.

13. A method, comprising
transmit, to a wireless device from a cellular network, information indicating one or more neighbor cells that support provision of a broadcast or multicast service in one or more of radio resource control (RRC) inactive mode or RRC idle mode, wherein the information is useable to perform cell re-selection while in RRC inactive mode or RRC idle mode based at least in part on the information; and
transmit, to the wireless device from the cellular network, the broadcast or multicast service while the wireless device is in RRC inactive mode or RRC idle mode on a cell.

14. The method of claim 13,
wherein the information indicates that a current serving cell of the wireless device does support provision of the broadcast or multicast service in one or more of RRC inactive mode or RRC idle mode.

15. The method of claim 13,
wherein the information indicates that a current serving cell of the wireless device does not support provision of the broadcast or multicast service in RRC inactive mode or RRC idle mode.

16. The method of claim 13,
wherein cells that support broadcast or multicast service are prioritized for the cell re-selection.

17. The method of claim 13,
wherein the information is transmitted via RRC signaling.

18. The method of claim 13,
wherein the information is transmitted via non access stratum signaling.

* * * * *